United States Patent
Ohno

(10) Patent No.: US 6,252,853 B1
(45) Date of Patent: Jun. 26, 2001

(54) SWITCHING ROUTER AND A DATAGRAM TRANSFER SYSTEM

(75) Inventor: Shuji Ohno, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/121,593

(22) Filed: Jul. 24, 1998

(51) Int. Cl.[7] .................................................. H04L 1/24
(52) U.S. Cl. ............................................ 370/242; 370/227
(58) Field of Search ..................................... 370/217, 225, 370/227, 242; 709/202

(56) References Cited

U.S. PATENT DOCUMENTS 5,949,974 * 9/1999 Ewing et al. ........................ 709/262

FOREIGN PATENT DOCUMENTS 2000-31989 * 1/2000 (JP).

* cited by examiner

Primary Examiner—Salvatore Cangialosi
(74) Attorney, Agent, or Firm—Antonelli, Terry, Stout & Kraus, LLP

(57) ABSTRACT

A label switching router which includes a data relay controller for transferring IP datagrams and controlling the transfer, detecting any transfer IP datagram satisfying a particular condition, and controlling an ATM switch based on a detection result and an ATM switch for switching between adjacent nodes for transferring ATM cells. An operation state of the data relay controller is monitored and a user-specified VP route is set to the ATM switch according to a fault circumventing route table, thereby continuing communication between the adjacent nodes on both side of this ATM switch if a fault occurs on the data relay controller.

18 Claims, 5 Drawing Sheets

FAULT OCCURRED ON
DATA RELAY CONTROLLER

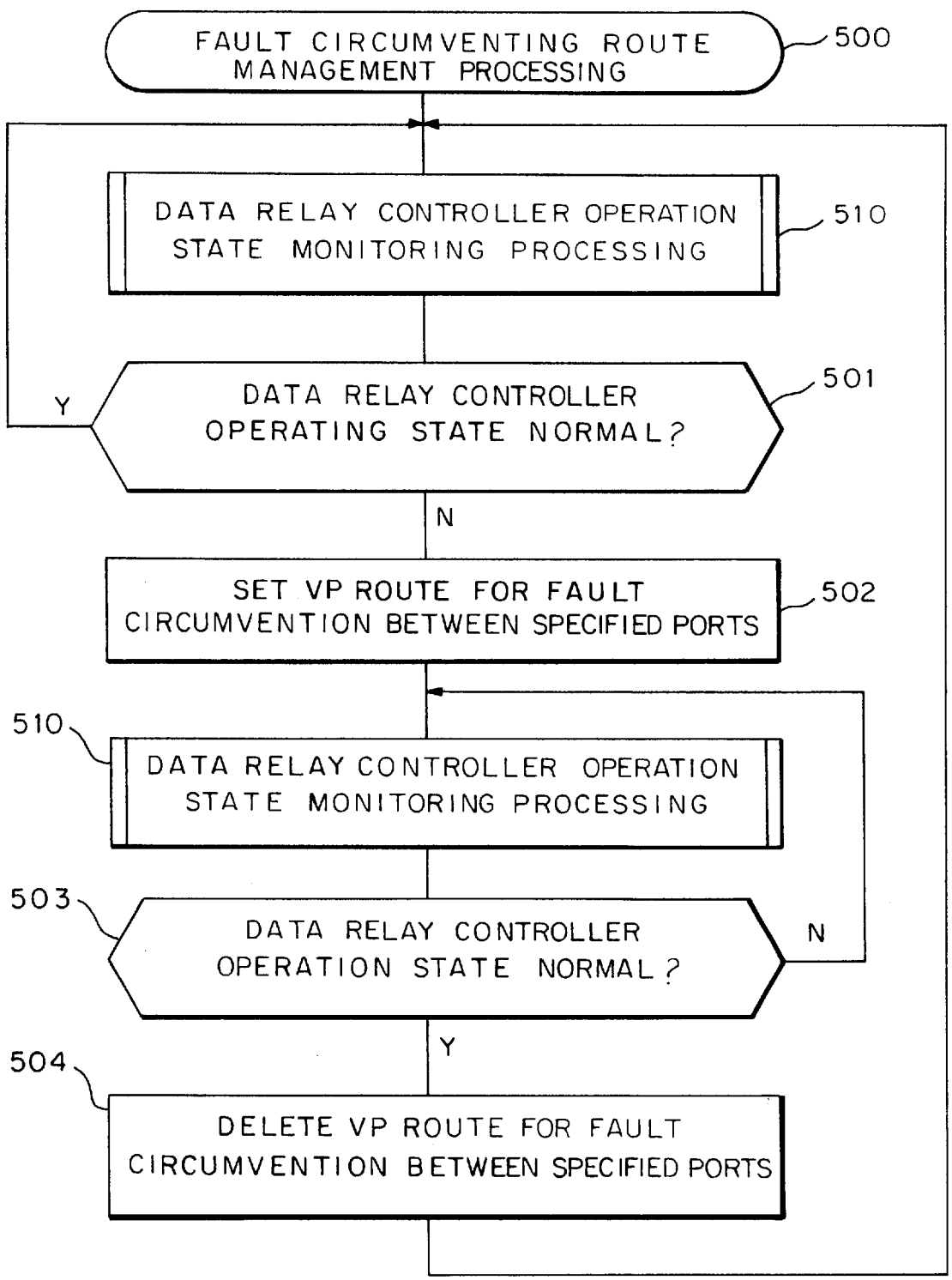

SWITCHING ROUTER AND A DATAGRAM TRANSFER SYSTEM

BACKGROUND OF THE INVENTION

The present invention generally relates to a network apparatus for use in building an IP (Internet Protocol) network and, more particularly, to a switching router for performing high-speed transfer (cut-through) of an IP datagram by use of an ATM (Asynchronous Transfer Mode).

With wide popularization of applications such as the WWW (World Wide Web), the quantity of information transferred over the Internet has been steadily increasing, thereby involving a problem as a bottleneck to the communication performance of the Internet, especially of the router, a network apparatus for transferring IP datagrams between adjacent networks. Datagrams as used herein represent data and/or programs. This problem is caused by that the transfer processing requires confirmation of destination for each of the IP datagrams.

To solve this problem, switching routers such as a label switching routine have been proposed in which the ATM switch is combined with a controller for performing transfer and control of IP datagrams. Specific schemes include a CSR (Cell Switch Router) disclosed on February 1997 in IETF (Internet Engineering Force) RFC (Request For Comments) 2098.

However, it is not taken into consideration for the switching routines such as the above-mentioned label switching router obtained by combining the ATM switch with the controller to cope with a fault occurring on the controller connected to the ATM switch. This may cause a problem in the transfer of IP datagrams between adjacent nodes. Therefore, the inventor hereof examined the case in which the controller fails. The following describes a result of this examination with reference to FIG. 6.

FIG. 6 shows a data relay controller 100 for performing transfer and control of an IP datagram, detecting data satisfying a particular condition in the transfer IP datagram, and controlling an ATM switch based on the result of the detection, an ATM switch 110 for switching between ATM cells, and an adjacent node 120 connected through an ATM line.

The adjacent node 120 and the data relay controller 100 presets a standard VC (Virtual Channel) route for transferring the IP datagram, or a so-called default VC route 140, on a given VP (Virtual Path) route 130 through the ATM switch 110. Normally, the IP datagram is transferred along the default VC route relayed by the data relay controller 100.

Then, when the IP datagram satisfying a certain condition is detected, the data relay controller 100 sets a VC route for directly connecting the destination of the detected IP datagram to the adjacent node 120 of the destination through the ATM switch 110, this VC route being referred to as a cut-through VC route 150. Between the adjacent nodes, IP datagrams are transferred over the cut-through VC route not relay by the data relay controller 100. This allows communication between the adjacent nodes 120 without confirming the destination of each IP datagram and performing transfer processing, thereby significantly enhancing the transfer performance of IP datagrams.

It should be noted that the communication route in the ATM is set by use of the VC route and the VP route 130 that bundles a plurality of VC routes. It should also be noted that a different network communicable only through the data relay controller 100 is originally provided between the adjacent nodes 120; in order to transfer IP datagrams directly between the adjacent nodes 120 through the cut-through VC route 150, each adjacent node 120 is mounted with a mechanism for encapsulating the IP datagrams addressed to the adjacent nodes 120 of the original IP datagrams.

Therefore, if IP datagrams are transferred between the adjacent nodes 120 through the data relay controller 100 in the above-mentioned constitution composed of the data relay controller 100, the ATM switch 110, and the adjacent nodes 120, occurrence of a fault on the data relay controller 100 connected to the ATM switch may disable the data transfer between the adjacent nodes 120 even if the ATM switch has no trouble.

SUMMARY OF THE INVENTION

It is therefore an object of the present invention to provide a switching router such as a label switching router capable of providing continuous data communication between adjacent nodes if a trouble occurs on a data relay controller without changing the same in any manner and automatically restoring the failed data relay controller.

In carrying out the invention and according to one aspect thereof, there is provided a switching router comprising a switching mechanism for transferring fixed-length data by hardware and a relay mechanism for computing an optimum route to a destination of variable-length data and transferring the same by software. Normally, data is transferred beforehand through the relay mechanism and data that satisfies a certain condition is transferred only through the switching mechanism without using the relay mechanism.

In the above-mentioned constitution, an ATM switch of the above-mentioned switching mechanism is provided with a monitoring means for monitoring an operation state of a data relay controller (the relay mechanism), a storage means for storing VP route information to be set if fault occurs on this data relay controller, and a VP route information storage managing means for setting a PV to the ATM switch and clearing the setting according to the above-mentioned VP route information storage means based on the operation state of the data relay controller monitored by the above-mentioned monitoring means.

As mentioned above and according to the invention, if a fault occurs on the data relay controller, use of the ATM switch based on the present invention can continue communication by automatically setting a fault circumventing route between user-specified adjacent nodes according to user definition, thereby protecting the users connected to the adjacent nodes concerned from being affected by the fault on the data relay controller.

Moreover, the ATM switch according to the present invention can automatically restore the data relay controller, thereby allowing the system manager to restore the system only by restoring the data relay controller.

BRIEF DESCRIPTION OF THE DRAWINGS

The scope of the present invention will be apparent from the following detailed description, when taken in conjunction with the accompanying drawings, and such detailed description and specific examples, while indicating preferred embodiments of the invention, are given by way of illustration only, since various changes and modifications within the spirit and scope of the invention will become apparent to those skilled in the art from this detailed description, in which:

FIG. 5 is a flowchart indicative of processing for managing a fault circumventing route in the label switching router of the above-mentioned embodiment.

DESCRIPTION OF THE PREFERRED EMBODIMENTS

Figure 1:
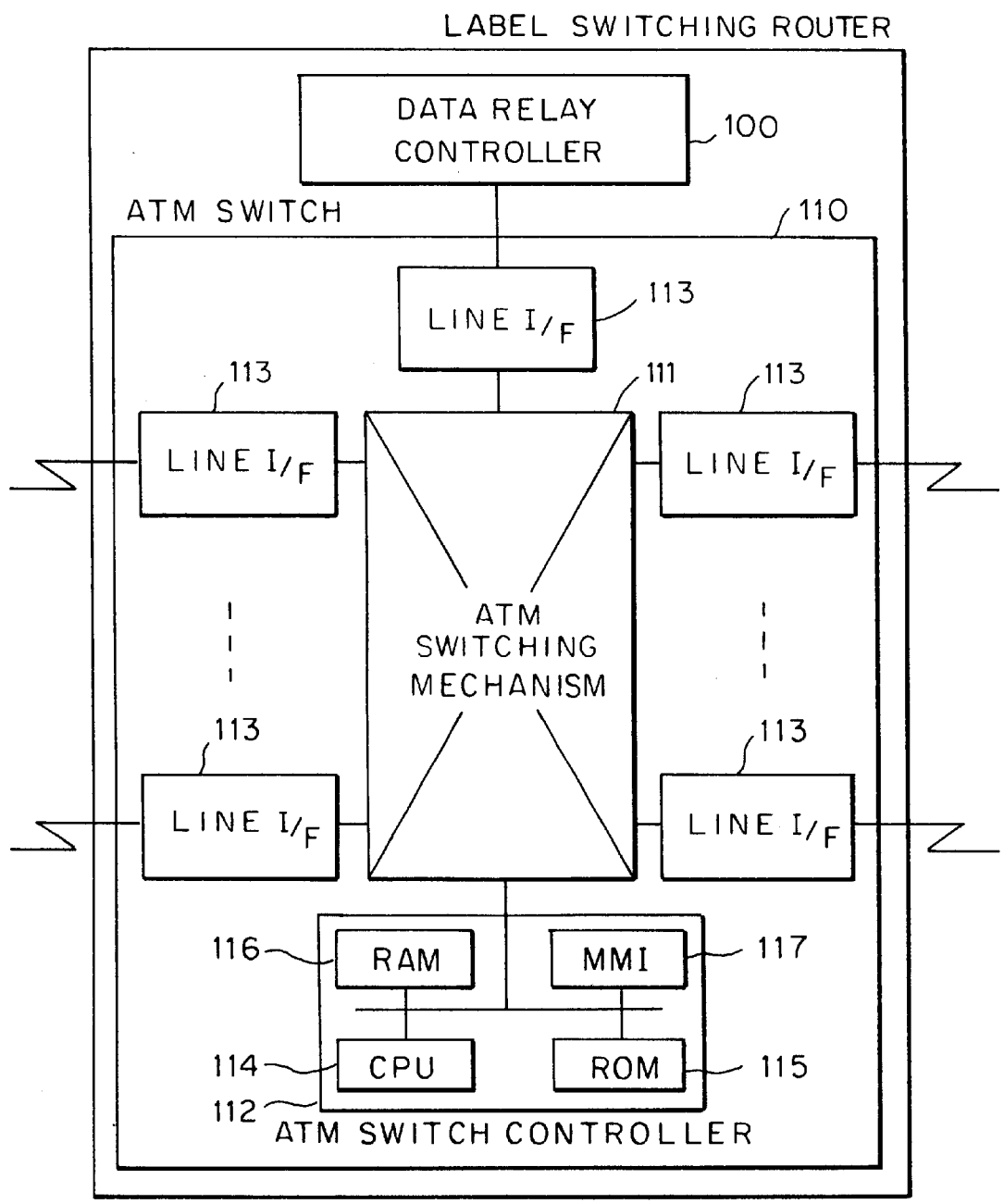
FIG. 1 is a block diagram illustrating a label switching router practiced as one preferred embodiment of the invention.
Figure 2:
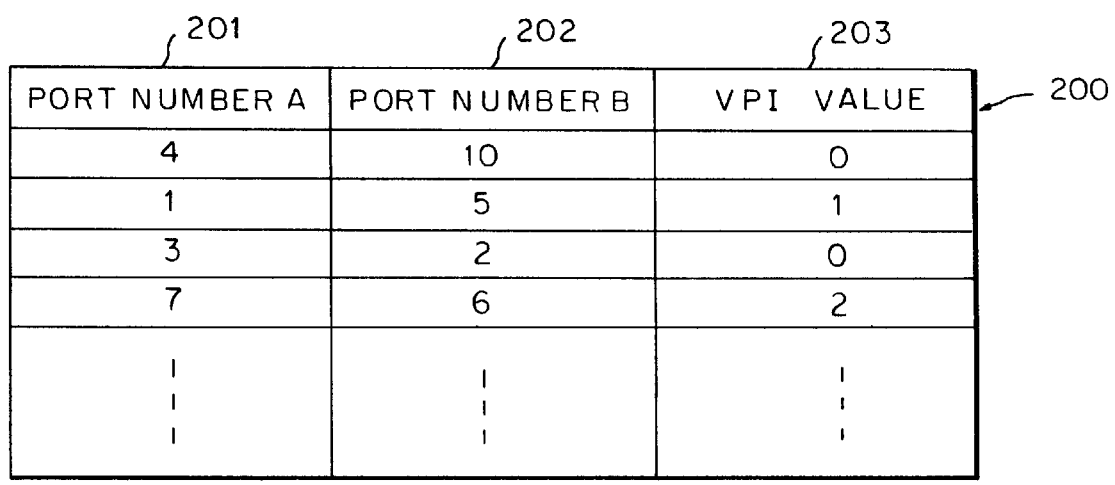
FIG. 2 is a diagram illustrating table (fault circumventing route information) format in the label switching router of the above-mentioned embodiment.
Figure 3:
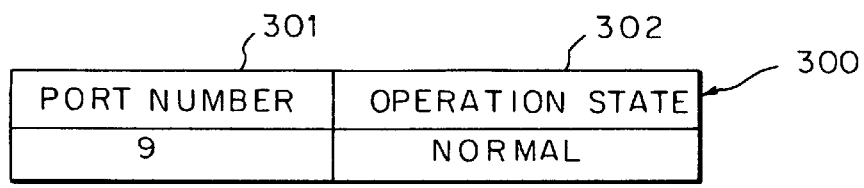
FIG. 3 is a diagram illustrating a table (data relay controller state) format in the label switching router of the above-mentioned embodiment.

FIG. 1 is a block diagram illustrating a label switching router practiced as one preferred embodiment of the invention. FIG. 2 and FIG. 3 are diagrams illustrating table formats in a the label switching router of the present embodiment. FIG. 4 is a diagram illustrating the setting of a communication route. FIG. 5 is a flowchart indicative of management processing of a fault circumventing route.

First, referring to FIG. 1, a constitution of the label switching router of the present embodiment and an internal structure of an example of an ATM switch that is one of the components of the label switching router will be described.

The label switching router of the present embodiment comprises a switching mechanism based on hardware and a relay mechanism based on software for performing cut-through on transfer IP datagrams. This label switching router is composed of a data relay controller 100 for transferring and controlling IP datagrams, detecting one satisfying a particular condition from the transfer IP datagrams, and controlling an ATM switch based on the detection result and an ATM switch 110 for switching between ATM cells.

The ATM switch 110 is provided with an ATM switching mechanism 111 for performing high-speed transfer of actually flowing cell data by hardware, an ATM switch controller 112 for controlling the ATM switch 110 and processing a command coming from the data relay controller 100, and a plurality of line I/F (Interface) units 113 for accommodating connection lines between the data relay controller 100 and network devices(adjacent nodes). As shown in FIG. 1, the ATM switch 110 can connect the plurality of line I/F units 113 to the ATM switching mechanism 111.

The ATM switch controller 112 in the ATM switch 110 incorporates a CPU (Central Processing Unit) 114 for executing control software for performing ATM switch control, a ROM (Read Only Memory) 115 for statically storing the control software to be executed by the CPU 114 and initial information in a fixed manner, a RAM (Random Access Memory) 116 for dynamically storing work information for the control software and tables to be described later, and an MMI (Man-Machine Interface) 117 for providing the user with the operation state of the ATM switch 110 and a procedure for setting the tables.

The following describes a table format associated with the present embodiment stored in the RAM 116 in the ATM switch controller 112 with reference to FIGS. 2 and 3.

FIG. 2 shows a format of a fault circumventing route table 200 for storing information about a fault circumventing route to be set through the MMI 117 of the ATM switch controller 112.

In the figure, reference numerals 201 and 202 denote port number A and B fields indicative of ports to which a Virtual Path (VP) route, a fault circumventing route, is to be set in the ATM switch 110. Reference numeral 203 denotes a VPI value field for storing a VPI (Virtual Path Identifier), which is information about the VP route, a fault circumventing route to be set between the above-mentioned port number A and B fields 201 and 202.

For example, values inputted by the user by use of the MMI 117 of the ATM switch 110 are stored in this fault circumventing route table 200. Further, in a field not storing user-defined information, a value (for example "−1") indicating that no value is stored is set.

FIG. 3 shows a format of a connection controller state table 300 for storing operation states of the data relay controller 100 connected to the ATM switch 110.

In the figure, reference numeral 301 denotes a port number field for storing a number indicative of a port of the ATM switch 110 connected to the data relay controller 100. Reference numeral 302 denotes an operation state field indicative of an operation state of the data relay controller 100 connected to the port indicated by the port number field 301.

For example, a value inputted by the user by use of the MMI 117 of the ATM switch is stored in the port number field 301. on the other hand, by executing a data relay controller operation state monitoring processing 510 to be described later of the ATM switch controller 112, the operation state field 302 stores, as a result monitored, "normal" or "abnormal" of the data relay controller 100 connected to the port indicated by the port number field 301. If the data relay controller operation state monitoring processing 510 detects that the data relay controller 100 is not connected to the port indicated by the port number field 301, "unconnected" is stored in the operation state field 302.

The following describes a state of a fault circumventing route to be set according to an operation state of the data relay controller 100 and a procedure for this setting with reference to FIGS. 4 and 5.

FIG. 4 is a diagram showing a VP route and a default/cut-through VC route to be set in a system associated with the present embodiment. FIG. 5 is a diagram showing fault circumventing route management processing 500 for setting and deleting a fault circumventing route.

Figure 4A:
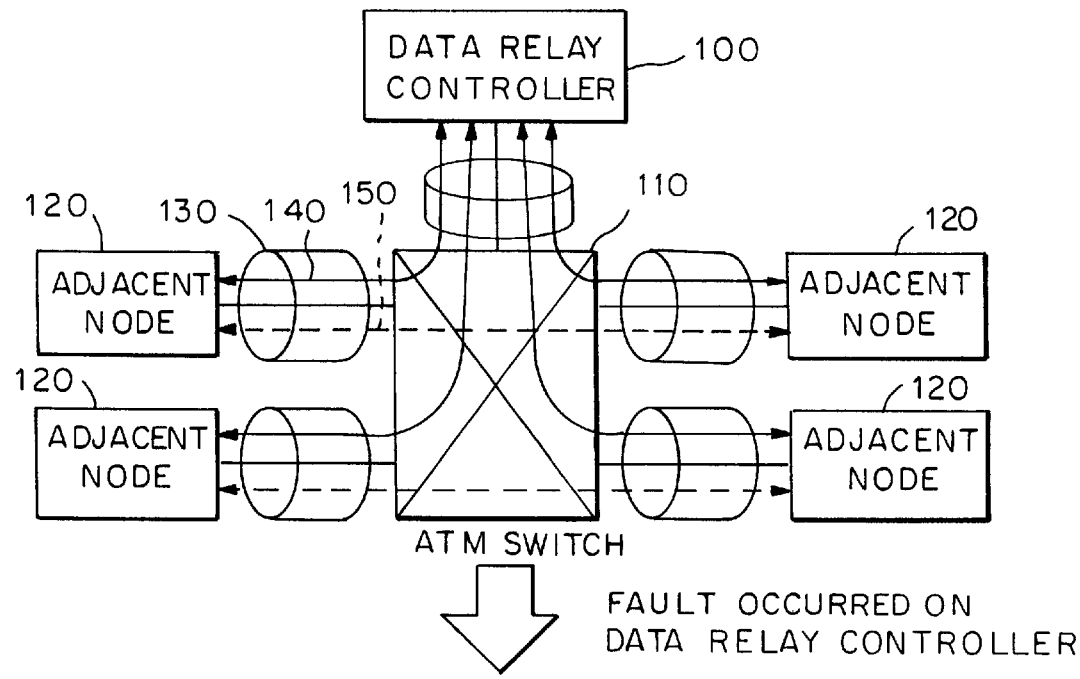
FIGS. 4(a) and 4(b) are diagrams illustrating settings of a communication route in the label switching router of the above-mentioned embodiment.
Figure 4B:
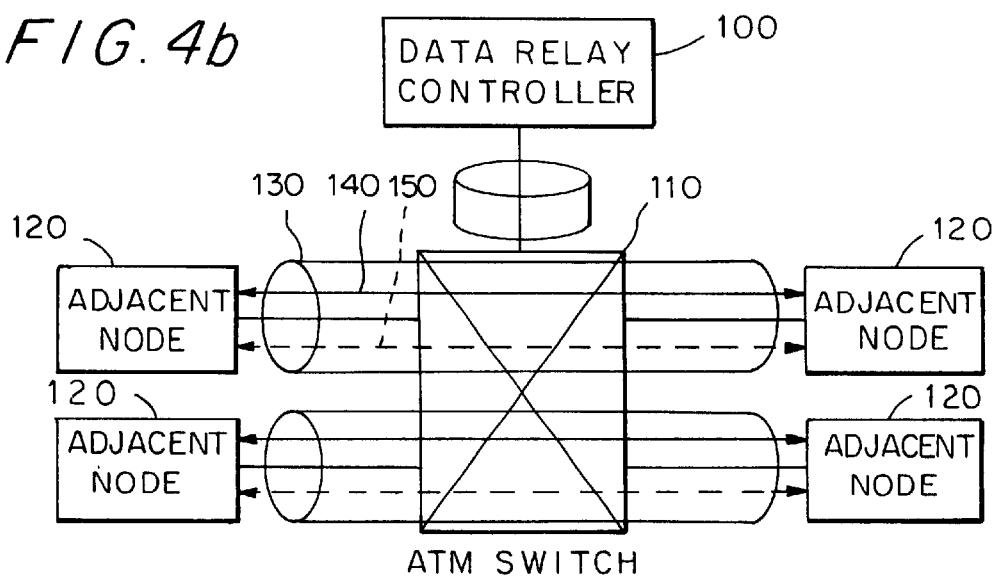
Figure 6A:
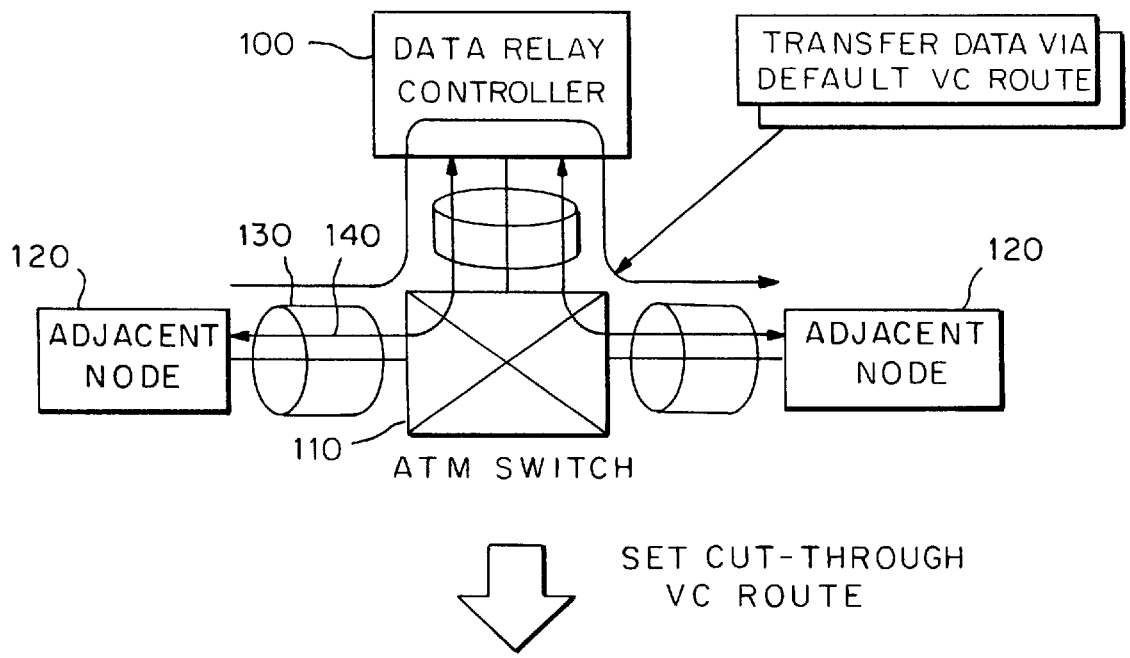
FIGS. 6(a) and 6(b) are diagrams illustrating examples of setting a communication route examined as a premise of the present invention.
Figure 6B:
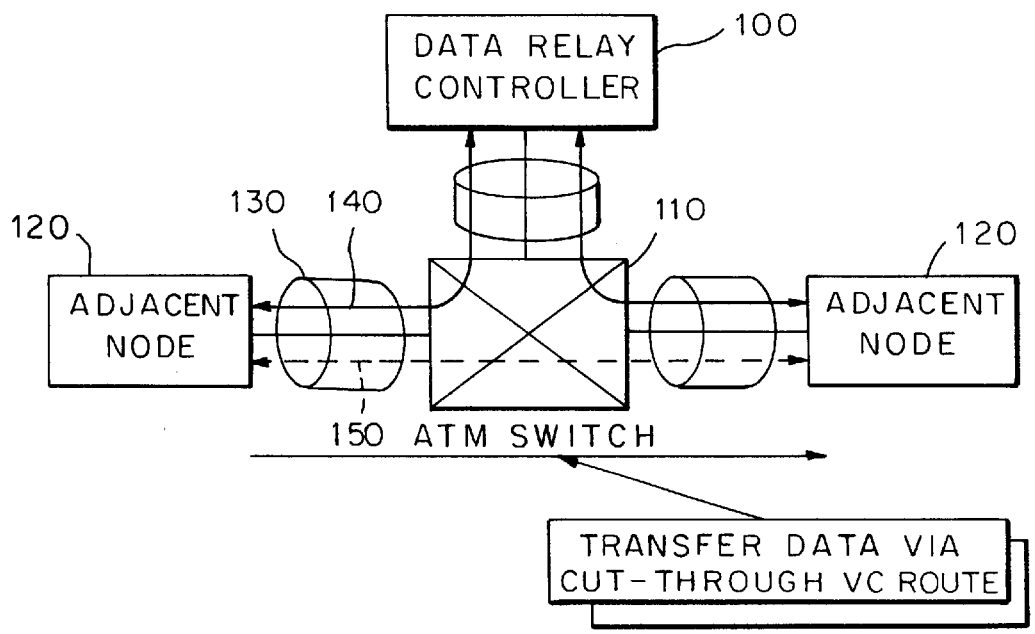

In FIG. 4, a system is shown composed of the data relay controller 100 and the ATM switch 110 for constituting the label switching router and adjacent nodes 120. FIGS. 4(a) and 4(b) show a communication route in a normal state and a communication route at fault occurrence of the data relay controller 100 respectively.

When the data relay controller 100 is operating normally, a default VC route 140 is set to a any given VP route 130 of each port and the VP route of the port to which the data relay controller 100 is connected and a cut-through VC route 150 that allows direct transfer of information between the adjacent nodes 120 is set between the VP routes 130 of the ports as shown in FIG. 4(a). The fault circumventing route management processing 500 to operate in the ATM switch controller 112 of the ATM switch 110 operates as follows.

FIG. 5 shows a flowchart of a program stored on ROM 115. This program is installed ROM 115 via network or external recording medium reading device(which is not shown in figures). And this program is executed by CPU1114.

First, the fault circumventing route management processing executes a data relay controller operation state monitoring processing 510 to check the operation state of the data relay controller 100. Then, the fault circumventing route management processing references the monitoring result from the operation state field 302 in the connection controller state table 300 (step 501). Because the result is "normal," the data fault circumventing route management processing repeats execution of the data relay controller operation state monitoring processing 510.

However, if a fault occurs on the data relay controller 100, the specified VP route 130 is set between the ports specified by the user as shown in FIG. 4(b). This VP route 130 provides a route that directly connects the adjacent nodes 120 connected to the port concerned. Therefore, the default VC route 140 and the cut-through VC route 150 are also set only between the adjacent nodes 120 connected through the above-mentioned VP route 130. It should be noted that the fault circumventing route management processing 500 to operate in the ATM switch controller 112 of the ATM switch 110 operates as follows.

The fault circumventing route management processing detects "abnormal" set by the data relay controller operation state monitoring processing 510 in the operation state field 302 in the connection controller state table 300 and, based on the information set to the fault circumventing route table 200, sets the specified VP route 130 between the specified ports (step 502). Again, the fault circumventing route management processing executes the data relay controller operation state monitoring processing 510 to continue checking if the operation state of the data relay controller 100 becomes "normal" (step 503).

Then, when the fault circumventing route management processing 500 detects that the operation state of the data relay controller 100 is "normal," the fault circumventing route management processing deletes the specified VP route 130 between the specified ports based on the information set to the fault circumventing route table 200 (step 504), executes the data relay controller operation state monitoring processing 510, and continues checking if the operation state of the data relay controller 100 becomes "abnormal" (step 501). At this point of time, the communication route has returned to the state shown in FIG. 4(a).

Therefore, according to the label switch router of the present embodiment, the ATM switch 110 composed of the ATM switching mechanism 111, the ATM switch controller 112, and so on is used, the user-specified VP route 130 is stored in the fault circumventing route table 200 and the operation state of the data relay controller 100 is stored in the connection controller state table 300, the operation state of the data relay controller 100 is monitored by the data relay controller operation state monitoring processing 510 based on the fault circumventing route management processing 500, and the user-specified VP route 130 is set to the ATM switch 110 according to the fault circumventing route table 200. This novel constitution ensures continuous communication between the adjacent nodes 120 on both sides of the ATM switch 110 if a fault occurs on the data relay controller 100. Further, the novel constitution can automatically restore the data relay controller 100 based on the fault circumventing route management processing 500.

While the above-mentioned preferred embodiment of the present invention has been described using specific terms, such description is for illustrative purposes only, and it is to be understood that changes and variations may be made. For example, in the above-mentioned embodiment, the data relay controller is externally attached to the ATM switch through the line I/F. It will be apparent to those skilled in the art that a constitution in which the data relay controller is incorporated in the ATM switch is also applicable only by changing the port number field of the connection control state table to information (for example, a slot number) indicative of an internal mounting location.

While the present invention has been described in detail and pictorially in the accompanying drawings, it is not limited to such details since many changes and modification recognizable to these of ordinary skill in the art may be made to the invention without departing from the spirit and scope of the invention, and all such modifications as would be obvious to one skilled in the art are intended to be included within the scope of the following claims.

I claim:
1. A switching router comprising:
   plural line interfaces each of which connects to a network device;
   a switching mechanism which switches connection among the line interfaces and performs datagram transfer among them; and
   a relay controller which controls the switching mechanism such as normally transferring data through the relay controller and transferring data that satisfies a certain condition only through said switching mechanism by skipping the relay mechanism;
   wherein the switching mechanism further includes
   a relay controller monitoring means for monitoring an operation state of the relay controller and an alternate route setting means for setting an alternate route when the relay controller monitoring means detects a fault on the relay controller.
2. A switching router according to claim 1, wherein the alternate route setting means restores connection among the line interfaces in the switching mechanism in case that the relay controller monitoring means further detects normal operation of the relay controller.
3. A switching router according to claim 1, wherein the relay controller monitoring means includes a first table storing connection place of the relay controller and an operation state of the relay controller.
4. A switching router according to claim 3, wherein the connection place stored in the first table is a port number of the relay controller.
5. A switching router according to claim 3, wherein the connection place stored in the first table is a slot number of the relay controller.
6. A switching router according to claim 2, wherein the alternate route setting means includes second table storing current route and its alternative route in the switching mechanism and the alternate route setting means performs setting alternative route/restoring current route based on the second table.
7. A switching router according to claim 6, wherein the current route in the second table is described as port numbers of two adjacent nodes communicating via the relay controller and the alternate route in the second table is described as virtual path connection.
8. A datagram transfer system comprising:
   first network device for sending datagram connecting first network;
   second network device for receiving the datagram connecting second network;
   a label switching router for connecting said first and second network, the label switching router comprising:
   plural line interfaces for connecting said first and second network, and a switching mechanism which switches connection among the line interfaces and performs datagram transfer among them; and a relay controller which controls the switching mechanism such as normally transferring data through the relay controller and transferring data that satisfies a certain condition only through said switching mechanism by skipping the relay mechanism;

wherein the label switching router further includes a relay controller monitoring means for monitoring an operation state of the relay controller and an alternate route setting means for setting an alternate route when the relay controller monitoring means detects a fault on the relay controller.

9. A datagram transfer system according to claim 8, wherein the alternate route setting means restores connection among the line interfaces in the switching mechanism in case that the relay controller monitoring means further detects normal operation of the relay controller.

10. A datagram transfer system according to claim 8, wherein the relay controller monitoring means includes a first table storing connection place of the relay controller and an operation state of the relay controller.

11. A datagram transfer system according to claim 10, wherein the connection place stored in the first table is a port number of the relay controller.

12. A datagram transfer system according to claim 10, wherein the connection place stored in the first table is a slot number of the relay controller.

13. A datagram transfer system according to claim 9, wherein the alternate route setting means includes second table storing current route and its alternative route in the switching mechanism and the alternate route setting means performs setting alternative route/restoring current route based on the second table.

14. A datagram transfer system according to claim 13, wherein the current route in the second table is described as port numbers of two adjacent nodes communicating via the relay controller and the alternate route in the second table is described as virtual path connection.

15. A data transfer method for a label switching router having plural of ports for connecting to adjacent nodes, switching mechanism for switching connections among the ports, and a data relay controller for controlling the switching mechanism, the method comprising the steps of:

monitoring an operation state of the data relay controller;

setting an alternate route for fault circumvention between specified ports when a wrong state of the data relay controller is detected by the monitoring step; and deleting the alternate route for fault circumvention between specified ports and restore restoring connection among the ports when normal operation is detected by the monitoring step after the setting step.

16. A data transfer method for a label switching router having switching mechanism and plural of ports for connecting to adjacent node and a data relay controller for controlling the switching mechanism, the method comprising the steps of:

monitoring an operation state of the data relay controller;

setting an alternate route for fault circumvention between specified ports when a wrong state of the data relay controller is detected by the monitoring step; and deleting the alternate route for fault circumvention between specified ports and restoring connection among the ports when normal operation is detected by the monitoring step after the setting step.

17. A computer program product stored on a computer readable medium for performing , when executed by a label switching router having plural of ports for connecting to adjacent nodes, switching mechanism for switching connections among the nodes and a relay controller for controlling the switching mechanism, the computer program product comprising:

monitoring an operation state of the data relay controller;

setting an alternate route for fault circumvention between specified ports when a wrong state of the data relay controller is detected by the monitoring step; and deleting the alternative route for fault circumvention between specified ports and restoring connection among the ports when normal operation is detected by the monitoring step after the setting step.

18. A computer program product stored on a computer readable medium for performing , when executed by a label switching router having switching mechanism and plural of ports for connecting to adjacent node and a data relay controller for controlling the switching mechanism, the computer program product comprising:

monitoring an operation state of the data relay controller;

setting an alternate route for fault circumvention between specified ports when a wrong state of the data relay controller is detected by the monitoring step; and deleting the alternate route for fault circumvention between specified ports and restoring connection among the ports when normal operation is detected by the monitoring step after the setting step.

* * * * *